United States Patent [19]

Kakigi

[11] 4,245,872

[45] Jan. 20, 1981

[54] CASING FOR ELECTRONIC APPLIANCES

[75] Inventor: Yasuji Kakigi, Chofu, Japan

[73] Assignee: Cybernet Electronics Corporation, Kawasaki, Japan

[21] Appl. No.: 33,249

[22] Filed: Apr. 25, 1979

[30] Foreign Application Priority Data

Apr. 29, 1978 [JP] Japan .............................. 53/58889[U]

[51] Int. Cl.³ ...................... A47B 67/02; A47B 81/06
[52] U.S. Cl. .................................. 312/242; 312/7 R; 312/291
[58] Field of Search .................... 312/7 R, 7 TV, 242, 312/291; 206/387

[56] References Cited

U.S. PATENT DOCUMENTS

| | | | |
|---|---|---|---|
| 2,795,639 | 6/1957 | Rawson | 312/242 X |
| 3,390,338 | 6/1968 | Race | 312/7 R |
| 3,685,879 | 8/1972 | Jsuji | 312/7 R |
| 3,832,025 | 8/1974 | Artner | 312/7 R |
| 3,897,885 | 8/1975 | Joyce | 206/387 X |

FOREIGN PATENT DOCUMENTS 218569  3/1961  Austria ..................................... 312/7 R

*Primary Examiner*—James T. McCall
*Attorney, Agent, or Firm*—Oblon, Fisher, Spivak, McClelland & Maier

[57] ABSTRACT

A casing for electronic appliances is disclosed. The casing has an inner case having spaces defined therein by partitions, the spaces being adapted to receive various manipulation members, and an outer case adapted to be closely fitted to the outside of the inner case. In assembling, the outer case is fitted to the outside of the inner case, after placing respective manipulation members in respective spaces in the inner case, so that the manipulation parts are firmly clamped between the inner and outer cases of the casing.

2 Claims, 9 Drawing Figures

CASING FOR ELECTRONIC APPLIANCES

BACKGROUND OF THE INVENTION

1. Field of the Invention

The present invention relates to a casing for electronic appliances and, more particularly, to a casing for use as a case accommodating a radio receiver for automobiles or the like electronic appliances.

2. Description of the Prior Art

For mounting a radio receiver on an automobile, the main body of the radio receiver accommodating main circuits and associated parts is installed behind the instrument board which inherently has a limited area. A narrow nose-like projection carrying various manipulation switches, the pocket of a cassette tape, a display section and so forth is extended from the chassis of the receiver body to the surface of the instrument board, to place these switches and so forth within the reach of the hand of a driver seated on the driver's seat.

These manipulation switches and so forth are connected to the circuits and associated parts through the opening formed in the front panel of the chassis of the receiver body. To this end, a holding member is used to mount and fasten these manipulation switches and so forth. After fastening with the holding member, these switches and so forth are enclosed and fixed by an outer case. Finally, knobs of the switches and other externally attached members are inserted from the outside of the outer case.

Thus, the assembling of the automobile radio receiver requires troublesome work including a large number of steps, due to the fact that manipulation switches or the like are concentrated to a restricted area, steps such as fastening of manipulation switches to the holding member, connection of the holding member to the chassis of the receiver body, attaching of the outer case and so forth. In addition, troublesome adjustment is required to correctly align the parts and the outer case with each other.

For this reason, the construction of conventional radio receivers for automobiles is not suitable for mass-production.

SUMMARY OF THE INVENTION

It is therefore an object of the invention to provide a casing for electronic appliances which makes it possible to assemble and attach the manipulation switches or the like without using any fastening means.

To this end, according to the invention, there is provided a casing for electronic appliances having: a molded inner case having at least one major surface in which are inserted or embedded manipulation members such as push button switches, display device, pilot lamps, and change-over switches or the like, said inner case having a space for receiving a tape cassette or the like, said space defined by partition walls, and said casing being adapted to be fixed at its back side surface to the opened area of the front panel of a chassis; and a molded outer case provided in its front panel with apertures corresponding to said manipulation members, said apertures being formed at portions of said front panel of said outer case aligning with corresponding manipulation members and having shapes similar to the shapes of exposed parts of corresponding manipulation members, said outer case being further provided with flanges formed around the back side opening thereof, and fixed to said front panel of said chassis at said flanges.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DESCRIPTION OF THE PREFERRED EMBODIMENTS

Figure 1:
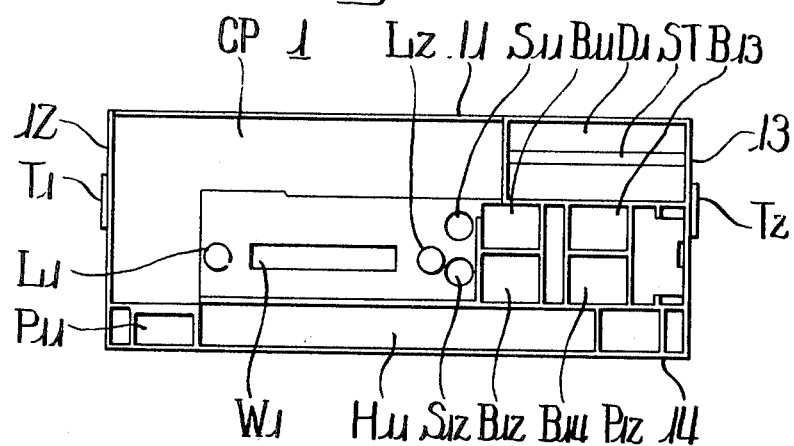
FIG. 1 is a front elevational view of an inner case.
Figure 2:
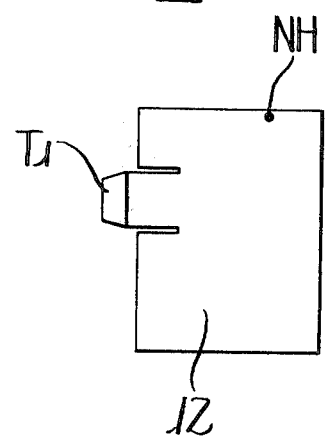
FIG. 2 is a side elevational view of the inner case.
Figure 3:
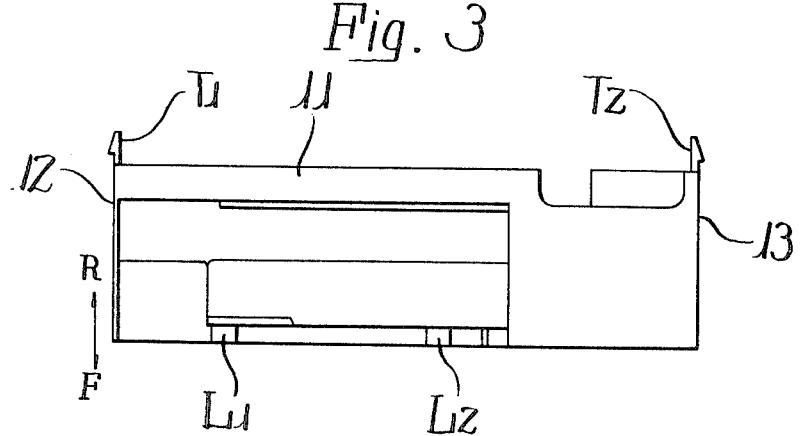
FIG. 3 is a plan view of the inner case.

FIG. 1 shows a front elevation of an inner case which is one of the constituents of the casing of the invention. As will be described latter, the inner case has spaces for accommodating push button switches, display device, pilot lamps and so on, as well as through bores for receiving levers of change-over lever switches, and also a space for receiving a tape cassette. These spaces are suitably formed and defined by partitions. A side elevation and a plan of this inner case are shown in FIGS. 2 and 3, respectively.

Figure 4:
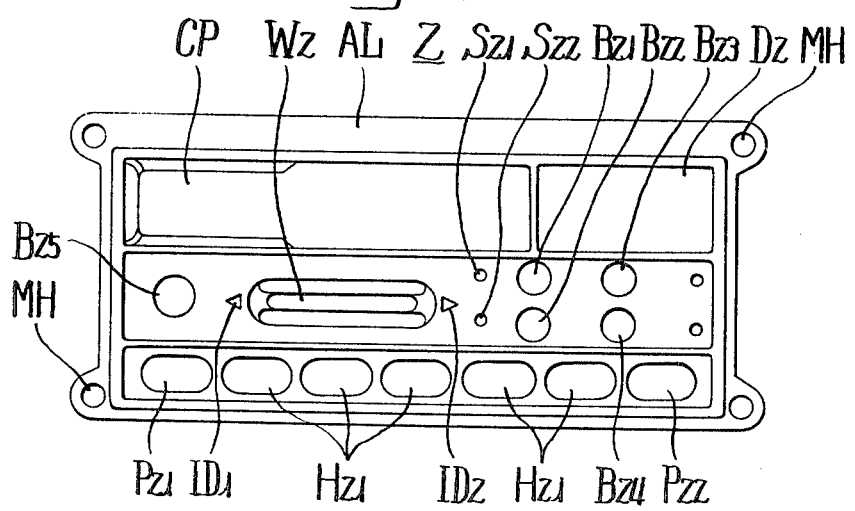
FIG. 4 is a front elevational view of an outer case.
Figure 5:
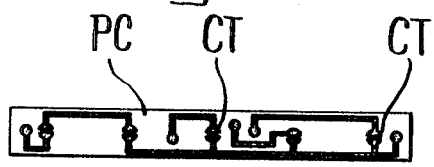
FIG. 5 is a plan view of a tuning switch print board.
Figure 8:
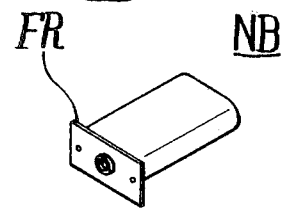
FIG. 8 shows a cylindrical cap constituting a switch knob.
Figure 9:
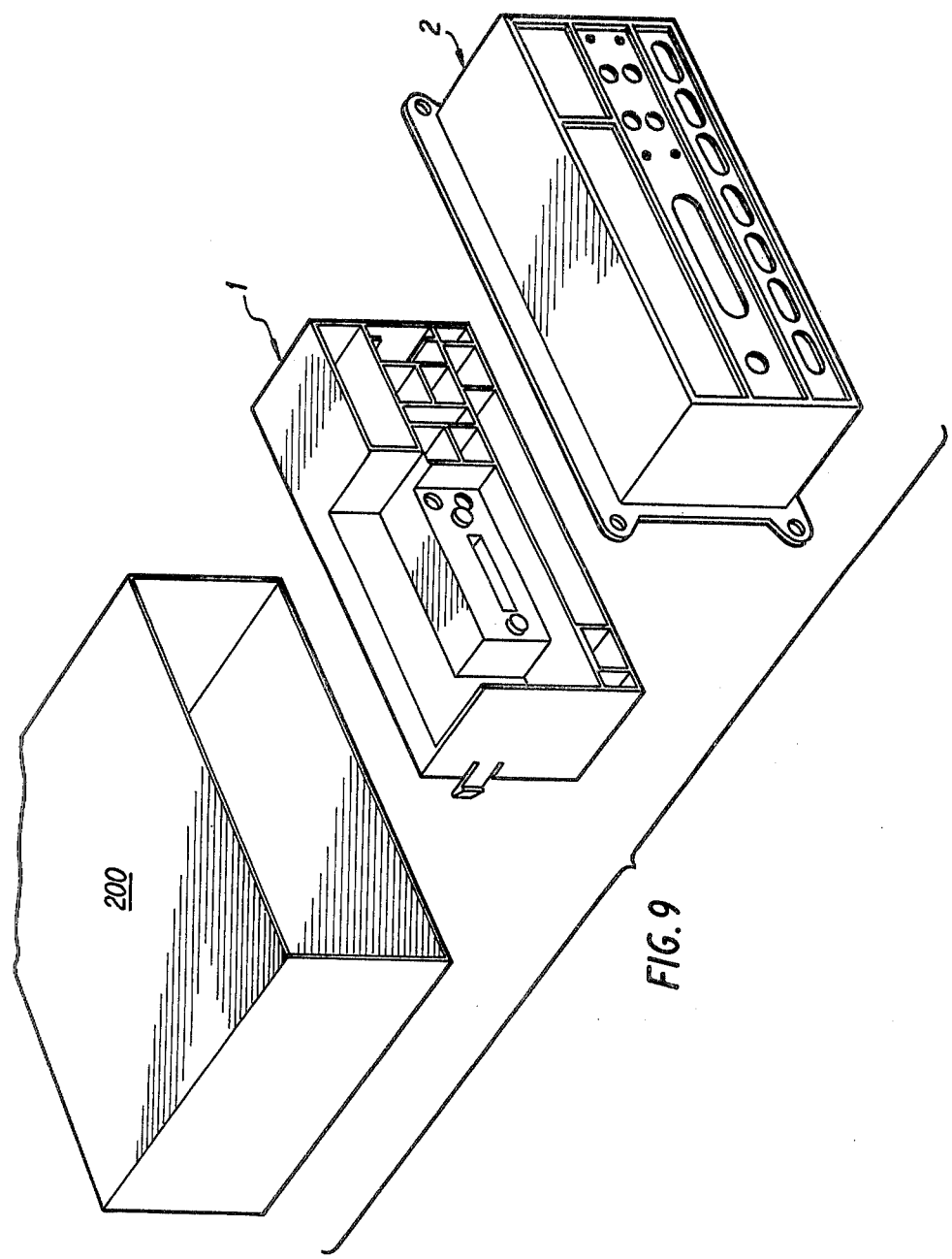
FIG. 9 shows an orthogonal view of the chassis, inner case and outer case.

FIG. 4 shows a front elevation of an outer case which is adapted to be closely fitted to the outside of the inner case. FIGS. 5 to 8 show the appearances of parts and switches which are installed in the inner case. FIG. 9 shows an exploded orthogonal view of the chassis, inner case and outer case.

In assembling, lead wires are beforehand connected electrically to the parts as shown in FIGS. 5 to 8, such as tuning printed circuit board PC, push button switches SW and so forth. Then, these parts are placed in respective spaces reserved in the inner case 1 which is molded from a plastic. More specifically, the tuning printed circuit board 92 is placed in a space 28, while the push button switches 102 with comb-like terminals are inserted into corresponding spaces 24, 30, 32, 34, 36 defined by partitions, with their lead wires placed inside. Similarly, a display device is placed in the space 44, while spaces 22 and 50 receive respective lamps. The space 52 is preserved for insertion and withdrawal of a tape cassette. A lever of a rewinding/forwarding change-over switch is received by an aperture 26.

The inner case 1 is adapted to be fixed to the periphery of an opening formed in a front panel of a chassis 200 by means of resilient tabs 20 and 38. The symbol 54 represents a small bore for bearing the door of a tape cassette pocket. The panels 12, 13, 14 of the inner case constitute outer walls of the casing over almost entire areas. As will be seen from FIG. 3, the panel 11 is cut away, leaving a connecting portion 12 extending between the front and rear edges F.R and defining the space for the tape cassette and the space for the display device.

Figure 6:
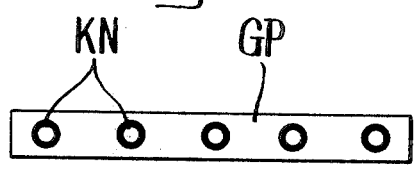
FIG. 6 is a plan view of an elastic contact plate.

As shown in FIG. 6, an elastic contact plate 98 made of rubber, carrying unitarily a plurality of knobs 96 disposed at a constant pitch, is placed beneath the tuning printed circuit board 92. Each knob 96 accommodates contacts made of a conductive material. The arrangement is such that, as the knobs 96 are pressed by caps 106 as shown in FIG. 8, the patterns 94 on the printed circuit board 92 complete the closed circuits.

The outer case 2 as shown in FIG. 4 is closely fitted to the outside of the inner case 1 in which the manipulation members have been placed.

The outer case 2 is provided with flanges 58 formed around the back side opening thereof, by means of which it is fastened to the front panel of the chassis. Apertures 90, 76, 68, 80, 78 and 70 formed in the outer case 2 correspond, respectively, to the bores 26, 44, 46, 32, 40 and 34 of the inner case.

62 and 66 may be formed by fitting transparent plates to the apertures corresponding to 22 and 50.

Figure 7:
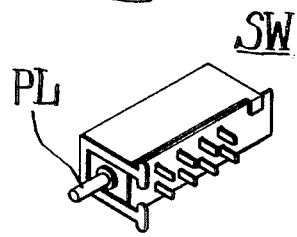
FIG. 7 is a perspective view of a push button switch.

When the switches received by the bores 32, 34, 40 and 46 are push button switches having a construction as shown in FIG. 7, the outer case 2 is fitted after fitting a sleeve-like cap 106 (See FIG. 8) to the shaft 100 of each switch. The cap 106 as shown in FIG. 8 is placed on the exposed portion of the parts placed in 24, 36 and 28, and then the outer case 2 is placed thereon. Since each cap 106 has a flange 104, the caps are kept in good order and do not come out of the apertures, because the flanges 104 are retained by the edges of the associated apertures of the outer case 2.

As will be understood from the foregoing description, according to the invention, the manipulation members which are to be arranged previously are correctly located by respective bores formed and defined by partitions, and the parts are placed in the same manner as block toys. It is therefore not necessary to employ any fixture or member for fixing these parts, and it is possible to assemble the parts with high efficiency. In addition, since the parts are placed and held in good order, the troublesome adjusting work can conveniently be eliminated. Further, since the outer case itself can be formed with plastic by molding to have any desired design, the weight of the whole electronic appliance is reduced and the finishing work is simplified to render the appliances mass-produceable.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A casing for electronic appliances comprising:
    a molded inner case having at least one major surface in which are located manipulation members, said inner case having a space for receiving tape cassette means, said space being defined by partition walls, and said inner case including means for fixing its back side surface to an opened area on the front panel of a chassis; and
    a molded outer case provided in its front panel with apertures corresponding to said manipulation members, said apertures being formed at portions of said front panel of said outer case aligning with corresponding manipulation members and having shapes similar to the shapes of exposed parts of corresponding manipulation members, said outer case being further provided with flanges formed around the back side opening thereof, and being adapted to be fixed to said front panel of said chassis at said flanges, wherein said outer case encloses said inner case when said outer case is fixed to said chassis.

2. The casing of claim 1 wherein said manipulation members include at least one from the group consisting of push button switches, a display device, pilot lamps, and change-over switches.

* * * * *